United States Patent [19]

Martin

[11] 4,223,759
[45] Sep. 23, 1980

[54] LOW ENERGY SOURCE FOR SEISMIC OPERATION

[75] Inventor: Philip N. Martin, Tulsa, Okla.
[73] Assignee: Mapco, Inc., Tulsa, Okla.
[21] Appl. No.: 963,982
[22] Filed: Nov. 27, 1978
[51] Int. Cl.³ .............................................. G01V 1/10
[52] U.S. Cl. .................................. 181/116; 89/40 L; 181/114; 181/401
[58] Field of Search ............... 181/116, 117, 119, 121; 89/1 R, 40 R, 40 L

[56] References Cited

U.S. PATENT DOCUMENTS

| | | | |
|---|---|---|---|
| 2,698,575 | 1/1955 | Poulter | 181/116 |
| 2,724,452 | 11/1955 | Sarge | 181/116 |
| 3,215,223 | 11/1965 | Kirby et al. | 181/117 |
| 3,216,320 | 11/1965 | Thomas et al. | 89/1 R |
| 3,232,168 | 2/1966 | Mangeng et al. | 89/40 R |
| 3,752,256 | 8/1973 | Mollere | 181/117 |
| 4,007,803 | 2/1977 | Airhart | 181/117 |
| 4,011,924 | 3/1977 | Barbier | 181/121 |
| 4,064,964 | 12/1977 | Norden et al. | 181/121 |

FOREIGN PATENT DOCUMENTS 473140  6/1975  U.S.S.R. ................................. 181/117

*Primary Examiner*—Howard A. Birmiel
*Attorney, Agent, or Firm*—Head & Johnson

[57] ABSTRACT

A lightweight, mobile, low-energy seismic source comprises an industrial shotgun, having a solid projectile combined with a base structure to support the gun in a substantially vertical position, slightly above the surface of the earth. The muzzle velocity of the projectile is sufficiently high that it can provide up to 9,000 foot pounds of energy impacting on the earth, which is comparable to that of some of the larger weight drop machines. Wheels or carrying bars can be provided for manual transport of the source.

14 Claims, 2 Drawing Figures

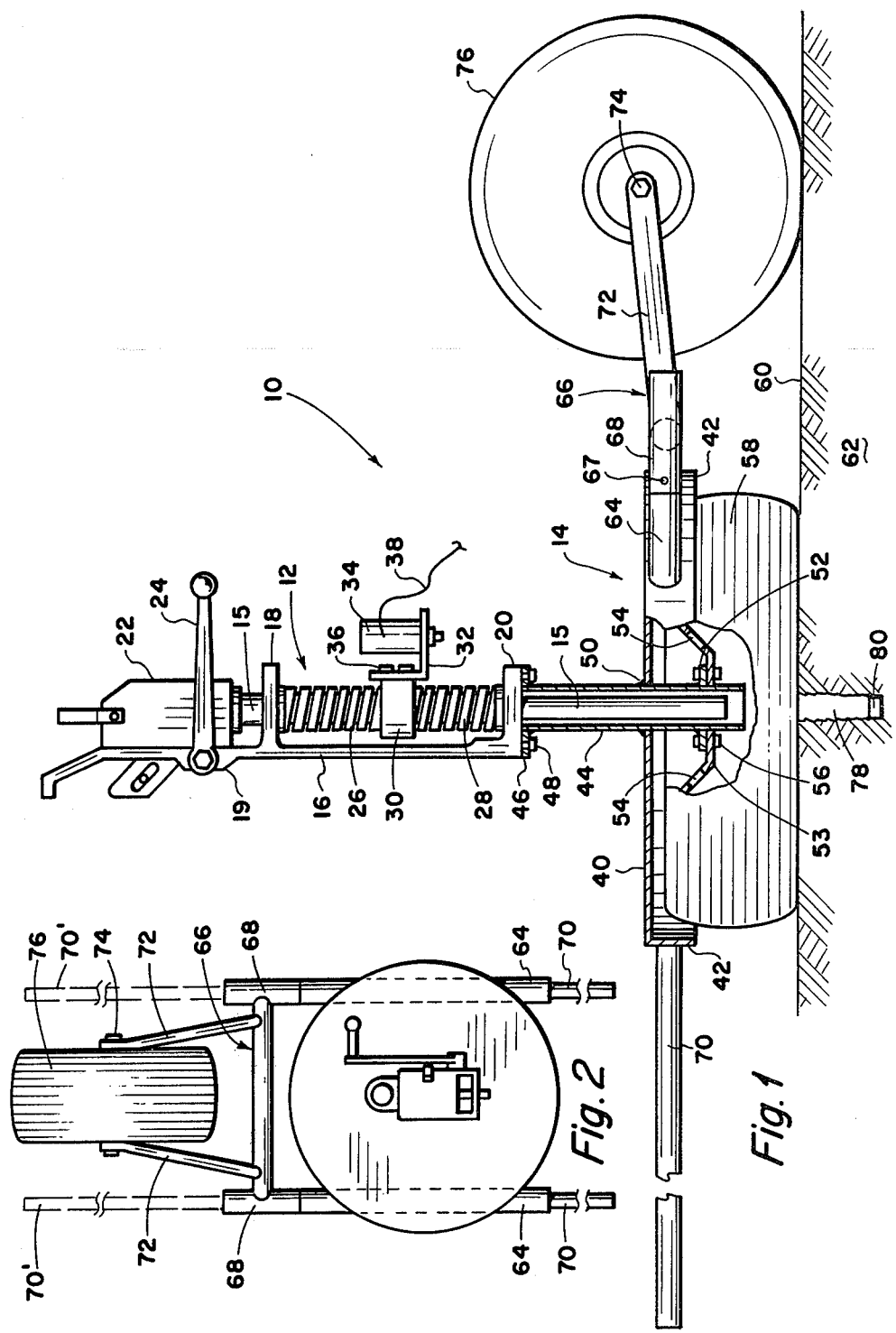
U.S. Patent  Sep. 23, 1980  4,223,759

LOW ENERGY SOURCE FOR SEISMIC OPERATION

BACKGROUND OF THE INVENTION

1. Field of the Invention

This invention lies in the field of seismic sources. More particularly, it concerns a seismic source in the class of "low-energy" seismic sources, wherein the impact energy is comparable to those provided by weight drop, gas guns, air guns, etc.

Still more particularly, this invention lies in the field of manually transportable seismic sources for use in areas which are completely inaccessible to motordriven vehicles.

2. Description of the Prior Art

Prior to about 15 to 20 years ago, the basic type of seismic source was an explosive charge placed in a drilled shot hole.

At about this time, with the development and improvement of magnetic recording systems, which made possible the summation or stacking of plural repetitions of a seismic source, a number of surface seismic sources having a seismic energy output comprising a small fraction of the energy output of explosive charges were developed and were used in conjunction with suitable stacking apparatus. Of course, with the advent of digital seismic recording and processing, the step of stacking can be accomplished extremely easily. Thus many different types of low energy sources are used today. Some of the more common types are vibratory sources, gas guns, air guns, weight drops, and so on.

It is well known that in order to get improvement in the signal/noise ratio, the source even though it puts out a weak signal must still put out more than a certain minimum energy, related to that which is contributed to the received signal by the wind and other noise sources. Consequently, there is a minimum energy requirement for any practical seismic source which must be provided in order to be able to produce useful seismic stacked records.

SUMMARY OF THE INVENTION

It is a primary object of this invention to provide a low-energy seismic source of low weight and high effective seismic input to the ground. It is a further object to provide a seismic source which is small and light enough to be transportable by manual means and has sufficient seismic energy output to be useful in a practical seismic exploration system.

These and other objects are realized and the limitations of the prior art are overcome in this invention by providing a seismic source which includes a gun comprising a barrel and a breech adapted to hold a shell having a propellant and a solid projectile, and having means to fire the shell and expel the projectile.

Base means is provided to support the gun in a substantially vertical position at a selected small distance above the surface of the earth. When the gun is fired the projectile is driven downwardly against the surface of the earth and will penetrate into the earth, dissipating its energy in the form of a seismic wave which travels downwardly through the earth.

The gun is an industrial shotgun which is used for firing projectiles at buildup of scale and other materials inside of boilers, kilns, and for other similar applications. It is safe and convenient to handle and fires cartridges which are classified as Class C explosives which may be used with minimum regulations for purchase, transportation, storage, and use.

While there are types of seismic sources which would be classed in the very-low-energy class, such as gasoline motor-driven earth tampers or air-driven jack hammers, for example, as the source—such an earth tamper or jack hammer does not put anywhere near the energy into the earth as is possible with the type of source of this invention. These tamper and jack hammer types are not relatively portable over all terrain, are very trouble-prone, extremely noisy, and propagate random energy inputs of erratic intentisties and require extremely high numbers of repetitions and stacking to provide a single seismic record.

The conventional types of low-energy sources such as vibrators, weight drops, air guns, gas exploders, and so on, do provide sufficient energy; but, because of their size and weight must be mounted on heavy vehicles and are therefore too difficult to maneuver in many areas where seismic exploration must be carried out.

Furthermore, it is well known that for shallow penetration studies of the earth by seismic means, the spacing along the earth between the source and the detectors is quite short, and these large and heavy motor-driven vehicles are very noisy, particularly at the very close offset distances. Furthermore, they are extremely expensive devices.

Further, when a method such as the gas exploders or gas guns are used, or the weight drops, the large masses which are needed to provide the high energy input to the earth tend to bounce and provide multiple series of impulses to the earth, which are extremely difficult to process. On the other hand, the apparatus of this invention provides a very lightweight projectile which is driven into the earth. Its energy is absorbed as it penetrates the earth and therefore does not provide any noise in the way of reverberatory bounces as provided by the other equipment.

The energy in foot-pounds provided by the impact of the projectile against the earth is comparable to the energy that is provided by a weight drop machine or a gas exploder and yet it is provided by a source which is a very, very small fraction of the weight and cost of the competitive sources.

There are many advantages of the large bore, projectile impact, portable, seismic energy source described by this invention over other sources, especially for shallow seismic prospecting. Some of these can be summarized as follows:

1. Energy propagation below the grass roots is superior in strength and in wide spectrum of frequencies to the energy propagation on the top surface cover only. This deep impact capability is especially advantageous on soft surface grassland, cropland, etc. The depth of impact can be increased by firing repeatedly at the same point on the earth's surface.

2. Subsurface, point-source energy propagation gives superior refraction first arrivals for near surface velocity determinations, which are frequently desired.

3. Uniformity and repeatability of energy inputs are superior to random and erratic thumps and pops. Source signature for advanced data processing is superior from a uniform energy input, and is nearly impossible from a system which requires hundreds to thousands of summed thumps and pops.

4. Absolute quiet before and after the shot allows up to zero offset distances between the source and the detectors.

5. The commercial shells provided for the industrial gun, which are eight-gauge, and provides a three-ounce lead projectile, are shelf-stock items which are rated as Class C explosives (small arms). These can be purchased, stored, transported and used in compliance with a minimum of regulations.

6. Contained and muffled explosion allows safe use near homes, buildings, and people.

7. The apparatus is portable by one person in a wheelbarrel configuration and is portable by two or four persons over any terrain.

8. Fast and easy, troublefree operation by a single shooter speeds data acquisition and surface coverage which lowers exploration cost.

BRIEF DESCRIPTION OF THE DRAWINGS

These and other objects and advantages of this invention and a better understanding of the principles and details of the invention will be evident from the following description taken in conjunction with the appended drawings in which:

FIG. 1 illustrates the completely assembled seismic source in position for operation, partly in cross-section.

FIG. 2 illustrates in plan view one type of carrying apparatus.

DESCRIPTION OF THE PREFERRED EMBODIMENT

Referring to the drawings and in particular FIG. 1, there is shown a low-energy, portable, lightweight, seismic source indicated generally by the numeral 10. This comprises two principal parts—an industrial shotgun indicated generally by the numeral 12, which is attached to and supported on a base means, indicated generally by the numeral 14.

One type of industrial shotgun which is suitable for this purpose is made by the Remington Arms Company and is called their Model 401 "Slugger". The 8-gauge shells are known as Magnum No. 081. This shell with a three-ounce lead projectile provides muzzle energy equal to about 9,000 foot pounds. One of the principal uses of this gun is in rotary kilns which are processing wet or dry cement, lightweight dolamite, lightweight aggregate, alumina, bauxite, phosphate, pelletizing iron ore fines, calcining lime sludge, etc. The Remington No. 401 industrial gun is also used to strip vertical kilns, chemical calciners, and to tap ferro-alloy furnaces.

It is interesting to note that 9,000 foot pounds of energy of the projectile is equivalent to the drop of a 1,000 pound weight from a height of 9 feet, which in normal seismic experience would provide a suitable seismic signal, though somewhat more noisy than that produced by the apparatus of this invention.

The gun 12 comprises a frame or cradle 16 which has two bored uprights 18 and 20 which are adapted to receive and hold the barrel 15 of the gun. An extension 19 of the base, or cradle, holds the breech 22 of the gun. An operating lever 24 opens the breech to permit insertion of a shell and then locks the shell in the breech prior to firing. Two helical springs 26 and 28 are provided which surround the barrel and are positioned between a block 30 which is clamped around the barrel of the gun and the two uprights 18 and 20. Clamping the block 30 to the barrel, and clamping the cradle 16 to the source base 14, permits the gun to move upwardly a short distance against the upper spring 26 on recoil of the barrel when a shot is fired.

The base 14 comprises a plate 40 which can be of any shape, such as circular, and has a short skirt 42 dependent from the outer perimeter of the plate 40. A tubular upright 44 is welded coaxial to the plate 40 and extends downwardly below the plate a selected distance. A flange 46 is provided at the top end to which the cradle 16 can be attached by bolts 48. The tube 44 can be attached to the plate 40 as by welding 50.

A support for the base is provided by an annular ring 58 which in operation lies on the surface 60 of the earth 62. A very satisfactory and preferable type of base support can be an automobile wheel 52 to which the automobile tire 58 is attached and inflated. The axial tubular extension 44 is attached to the wheel by means of a flange 52 on the tubular support 44. This is attached to the wheel by means of bolts 56. There are a plurality of openings 54 in the web of the wheel as is customary, so that combustion gases issuing from the muzzle of the gun can pass upwardly through these openings 54 to the space over the wheel and tire and under the plate 40 and out under the skirt 42.

A bracket 32 is attached to the clamp 30 that is locked to the barrel 15. On this bracket is a sensor pickup 34 such as is commonly used in seismic operations to detect the shot instant or time zero. This can be attached as by a bolt or other means, as is well known in the art. The bracket 32 can be attached by bolts 36. The output leads of the pickup 34 are shown as 38 and would be connected to an amplifier and recorder to indicate the shot instant, for purposes of computing travel time from the source of the seismic wave to a detector.

What has been so far described is the gun and base which together comprise the seismic source. This is all that is required for the source. However, it is convenient to provide means which will now be described for transporting the seismic source.

One method is forming a wheelbarrel type system in which two bars 70, FIG. 2, are inserted into a pair of pipes 64 which can be attached underneath or on top of the plate 40 and if long enough, can extend to the front as 70'. Thus, means are now provided for two or four men to carry the gun assembly by holding on each of the two ends of the two rods 70, 70'. If the terrain permits, it is possible to add a small framework 66 which can be attached to the front end of the bar 70 comprising two pipe collars 68 and the frame 66 with two legs 72 supporting an axle 74 for the wheel 76.

Just below the bottom of the barrel there is shown a projectile 80 which has been fired into the earth, creating a small hole 78 by compression and rubblizing the earth in the short instant that the seismic wave is generated.

What has been described is a simple type of seismic source, which uses a commercial shotgun, which fires a projectile into the earth. Different types and makes of guns, of course, can be used, and varying structure of the base is also possible. Also, it is possible to load the base with metal or rock, or by having one or more men stand on the base, which provides a firmer support for the gun in its recoil operation.

While the position of the gun muzzle above the ground is not critical, a dimension of about 6 inches has been found satisfactory. However, different spacings may be better for different surface conditions, such as hard or soft earth, gravel, rock, etc. Also, it has been found preferable to extend the cylinder 44 two to three inches beyond the muzzle.

While a projectile disc weighing 3 ounces has been found satisfactory, lighter or heavier projectiles may be found to be preferable with different surface materials and with different loading of explosive material in the shell.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A lightweight, mobile, low-energy seismic source, comprising;
   (a) a gun, comprising a barrel and a breech, adapted to hold a shell having a propellant and a solid projectile, and means to fire said shell;
   (b) base means to support said gun in a substantially vertical position slightly above the surface of the earth, the base comprising;
      (1) an annular means adapted to rest on the earth,
      (2) horizontal plate means supported coaxially above said annular means and having and opening therethrough;
      (3) means to support said gun vertically, with its barrel over said plate means opening, and the muzzle of said barrel being positioned a selected distance above the surface of the earth;
   whereby when said shell is detonated, said projectile will be ejected at high velocity from said barrel, downwardly through said opening in said base, to strike and penetrate the surface of the earth to generate a seismic wave.

2. The seismic source as in claim 1 including means to support additional mass on the top of said base, to increase the total mass of said source.

3. The seismic source as in claim 1 including means to transport said source by manual means.

4. The seismic source as in claim 3 in which said means to transport said source comprises means to removably attach two parallel horizontal poles to said base, one on each side of center.

5. The seismic source as in claim 4 including a wheel removably attached to said base means adapted to rotate on a horizontal shaft, the plane of said wheel passing through the axis of said base and parallel to said poles.

6. The seismic source as in claim 1 in which said ring means is an automobile type wheel and tire.

7. A mobile seismic source comprising;
   a projectile firing gun;
   a portable base having an opening therethrough, said gun being mounted on said base for firing projectiles through said opening, said base adapted to rest on the earth's surface and providing a ground seal around said opening and providing means of intercepting and confining solid objects dislodged from the earth when a projectile is fired by said gun.

8. A mobile seismic source according to claim 7 including:
   means to vent firing induced gases through said base.

9. A mobile seismic source according to claim 7 including
   wheel means affixed to said base whereby the base may be moved on the earth's surface.

10. A mobile seismic source according to claim 9 including;
    handlebars extending from said base to permit the base to be moved manually on the earth's surface.

11. A mobile seismic source according to claim 7 wherein said base has an upper surface adaptable to permit an operator to stand thereon during firing procedures.

12. A mobile seismic source according to claim 7 wherein said base is of sufficient weight to prevent it from being lifted from engagement with the earth's surface when said gun is fired.

13. A method of seismic exploration in the earth, comprising:
    positioning a projectile firing device above and directed towards the surface of the earth;
    firing a projectile from the device to impact the earth's surface; and
    detecting the resulting seismic signal.

14. A method of seismic exploration in the earth, comprising:
    moving a wheel supported projectile firing device on the earth's surface to a selected location;
    firing a projectile from the device to impact the earth's surface at the selected location; and
    detecting the resulting seismic signal.

* * * * *